(No Model.) 2 Sheets—Sheet 1.
J. F. SCHELLER.
RADIIMETER.
No. 459,656. Patented Sept. 15, 1891.
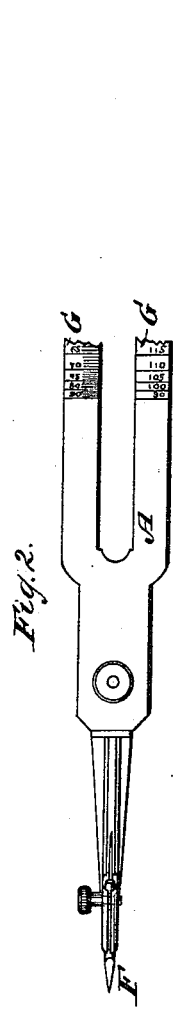
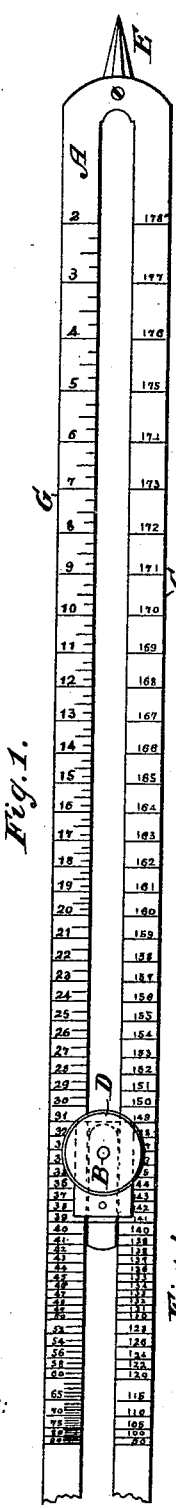
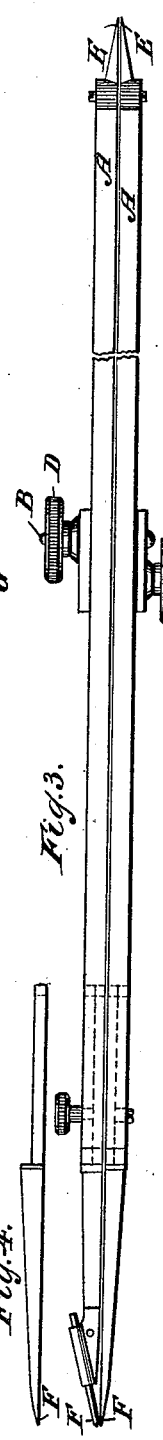
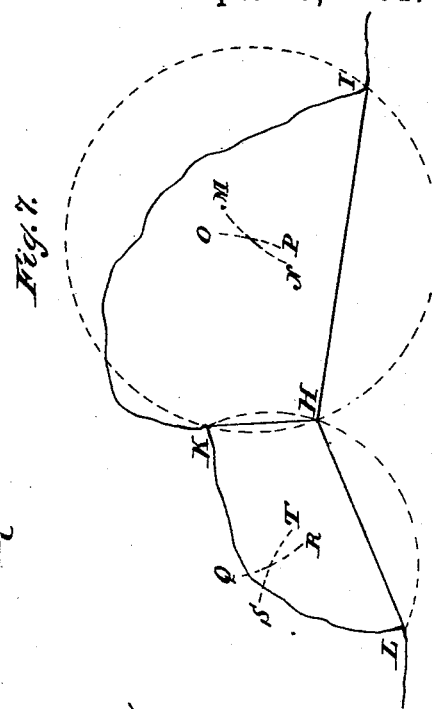
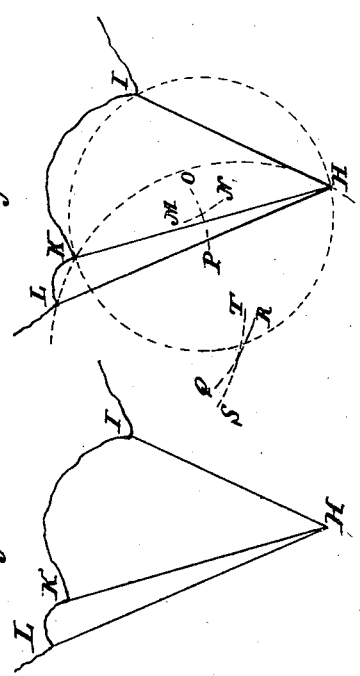
WITNESSES:
Edward Wolff
William Miller
INVENTOR
John F. Scheller.
BY
Van Santwood & Hauff
his ATTORNEYS (No Model.)
2 Sheets—Sheet 2.
J. F. SCHELLER.
RADIIMETER.
No. 459,656.　　　　Patented Sept. 15, 1891.
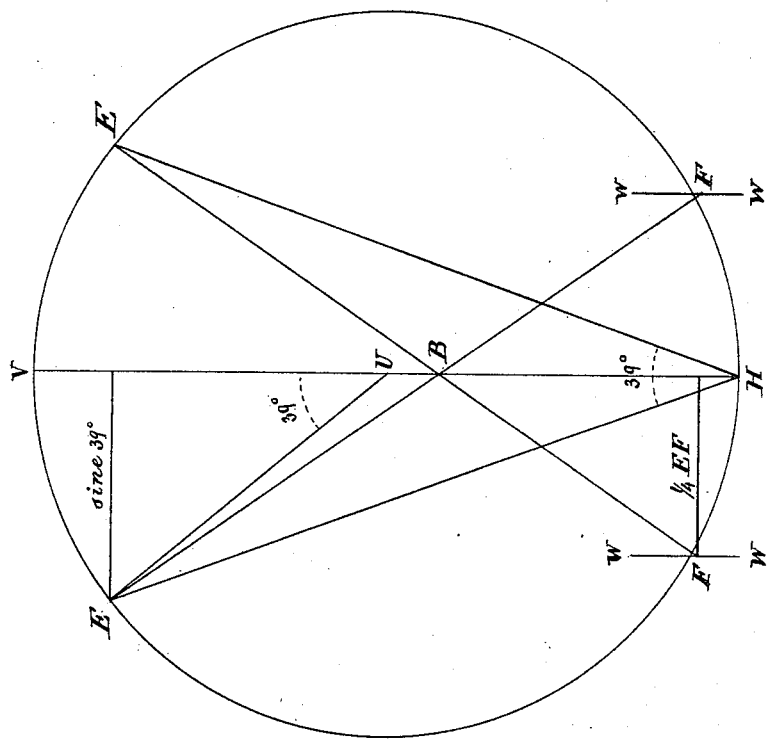
WITNESSES:
Edward Wolff
William Miller
INVENTOR:
John F. Scheller.
BY
Van Santvoord & Hauff
ATTORNEYS

UNITED STATES PATENT OFFICE.

JOHN F. SCHELLER, OF CITY ISLAND, NEW YORK.

RADIIMETER.

SPECIFICATION forming part of Letters Patent No. 459,656, dated September 15, 1891.

Application filed November 13, 1890. Serial No. 371,310. (No model.)

*To all whom it may concern:*

Be it known that I, JOHN F. SCHELLER, a citizen of the United States, residing at City Island, in the county of Westchester and State of New York, have invented new and useful Improvements in Measuring-Instruments or Radiimeters, of which the following is a specification.

This invention relates to an improvement in measuring-instruments, the instrument in question being conveniently termed a "radiimeter;" and said instrument serves to solve in a quick and accurate way the well-known "three-point problem," or, as it is sometimes termed, "the problem of the two circles," in order to find a ship's position. The three-armed protractor heretofore used for solving this problem is at times found objectionable, since the three points may be in such a position as to interfere with the use of such protractor, as would be the case when one or more of said points or the objects on a chart designating such points are hidden by the arc of the protractor. In case an angle is very acute—as, for example, less than ten degrees—such angle cannot be laid off on the three-armed protractor, since the legs of the protractor would overlap. By means of the radiimeter angles of various sizes can be accurately laid off, even should the angle be very acute.

In the annexed drawings, Figure 1 shows a face view of a radiimeter partly broken off. Fig. 2 shows the part broken off, Fig. 1. Fig. 3 is an edge view of Fig. 1. Fig. 4 shows a pointed end. Figs. 5, 6, and 7 illustrate the manner of using the instrument, and Fig. 8 is a diagram hereinafter explained.

The radiimeter is constructed on the plan of proportional dividers or compasses.

The letters A A indicate the legs of the instrument, having an adjustable pivot or indicator B, with its setting-button C and clamping-screw or nut D. One set of points or ends is indicated by the letters E E, the other by F F. One of the points or ends F can be formed by a pencil or marker, Fig. 3, or by a pointed end, Fig. 4. The scale G of the radiimeter is so graduated that when the pivot or indicator is set to a number indicating the degrees of an angle and one set of ends—as, for example, the ends E—is placed over the points indicating the mouth of the angle the other set of ends—as, for example, the ends F—will measure the radius of a circle the circumference of which passes through said points and the apex of the angle.

The radiimeter is used as follows: Let H, Fig. 5, indicate the position of a ship and I K L three prominent points on shore—as, for example, headlands or light-houses. From the deck of vessel H measure the angles I H K and K H L. Suppose the angle I H K to be thirty-nine degrees and the angle K H L to be seven degrees. Set the pivot or indicator to the figure 39 on scale G and place the ends E E on the points I K, indicating the mouth of angle I H K on a chart or map, Fig. 6. The distance between the ends F F will then equal or measure the radius of a circle whose circumference passes through the points H I K. With this distance or radius and using the point I as a center draw the arc M N and with the same radius and using point K as a center draw arc O P. The intersection of the arcs M N and O P will give the center of said circle H I K. This circle H I K is then drawn about said center. The pivot or indicator is then shifted to the figure 7 on scale G and the ends E placed on points K L. The distance between ends F will then equal the radius of a circle whose circumference passes through the points H K L. After the center of this circle has been determined by the intersection of arcs Q R and S T said circle H K L is drawn and the intersection of the circumference of this last-named circle with the circumference of circle H I K will fix the point H or the position of the ship H. The circles H I K and H K L may be appropriately called "circles of position." In the example shown in Fig. 6 the angles are acute; but the radiimeter can also be used if the angles are obtuse—as illustrated, for example, in Fig. 7, where both angles I H K and K H L are greater than ninety degrees. It is to be noticed when the angle is less than ninety degrees—as is the case, for example, with angle I H K, Fig. 5—that then the center of the circle of position H I K lies on that side of a line joining the observed objects I K, which is toward the observer or point H. When the angle is greater than ninety degrees, as in the case of angle I H K, Fig. 7, the center of the circle of position H I K lies on that side of a line joining the observed objects I K which is from the observer. If only two points are available—as, for example, the points I K—then the position of the ship on the circumference H I K can be determined by a sounding or by ascertaining the compass bearing or astronomical bearing of one of the objects I or K. Of course the instrument need not be confined to measuring at sea, since it can be used elsewhere—as, for example, on shore or inland.

The instrument is of service in keeping a ship out of danger, since, for example, if the circle of position H I K is drawn and the circumference of said circle passes clear of dangers or shoals it assures the safety of the vessel, while if said circumference of said circle passes through a danger or shoal the requirement for caution or for a change in the ship's course at once becomes apparent.

The rule for finding the scale of the radimeter may be stated as follows: Multiply the sine of the required angle by the length of the entire instrument, and divide the product by the sum obtained by adding one-fourth of the length of the entire instrument to the sine of the angle. The quotient is the distance from the point or points E at which the pivot B must be located in the case of said angle. In case the indicator and pivot do not coincide the distance from the indicator to the pivot must be either added or subtracted, as the case may be, to locate the scale-mark for the angle. In the example shown in the drawings this distance between indicator and pivot must obviously be added.

In case the calculation is to be carried out by logarithms then the rule may be stated as follows: To the logarithm of the sine of the required angle add the logarithm of the length of the entire instrument. From this sum subtract the logarithm of the sum obtained by adding one-fourth of the length of the entire instrument to the sine of the angle. The remainder is the logarithm of the distance from the point or points E at which the pivot B must be located in the case of said angle.

To illustrate the rule in the shape of a formula, let E F equal the length of the entire instrument and let E B equal the required distance at which the pivot B must be located in the case of any angle, as, for example, an angle of thirty-nine degrees, then expressing the formula in the shape of a proportion.

$$\left(\frac{EF}{4} + \text{sine } 39°\right) : \text{sine } 39° :: EF : EB \text{ or by logarithms.}$$

$$\log \text{sine } 39° + \log EF - \log \left(\frac{EF}{4} + \text{sine } 39°\right) = \log EB.$$

In working by the above formula it is to be noticed that the sine of the required angle is drawn to a radius which equals one-half the length of the entire instrument.

The formula is obtained as follows, reference being made to the drawings, Fig. 8: With U as the center, draw a circle whose radius equals $\frac{EF}{2}$, or whose diameter equals E F, equal the length of the instrument. Let H U V be a diameter, and with the point H as the apex draw the angle E H E equal to thirty-nine degrees. Then the angle at the center U, and having its mouth at E E—that is, the angle E U E—equals twice thirty-nine degrees, or one-half the angle E U E, or the angle E U V equals thirty-nine degrees. From the point E is then drawn the sine thirty-nine degrees. The lines W W are then drawn parallel to diameter H U V, each line W being removed from said diameter a distance equal to one-half the radius, so that the distance between lines W W equals the radius, or one-half E F, and the distance from one line W to the diameter H U V equals one-fourth E F. From the points E F to the lines W W draw the lines E F, each equal to the length of the instrument, and the intersection of the lines E F or the point B will give the location of the pivot when the instrument is set for an angle of thirty-nine degrees. The points E, it is noticed, lie on the circumference of the circle, while the points E F in this, as in most cases, lie somewhat beyond the circumference. The distance F F, it is noticed, always equals the radius of the circle, or the distance from a point F to the diameter H U V equals one-half the radius or one-fourth E F. The diagram then contains two right-angled triangles. One right-angled triangle has the hypotenuse E B and a side designated sine thirty-nine degrees. The other right-angled triangle has the hypotenuse F B and a side designated one-fourth E F. The sum of the hypotenuses or E B plus B F equals E F, or the length of the instrument. Then $(\frac{EF}{4}$ plus sine thirty-nine degrees) : sine thirty-nine degrees :: E B plus B F) or E F : E B, which is the formula already given. E B equals the distance from point E sought for pivot B, and said distance E B is readily found from the above proportion.

Example: Let E F or length of instrument equal three hundred and eighty-one millimeters, one-half E F or the radius equal 190.5 millimeters, one-fourth E F equal 95.25 millimeters. The sine of thirty-nine degrees equals 119.88 millimeters if the radius equals 190.5 millimeters.

Then by logarithms—

Logarithm sine thirty-nine degrees...2.078766
Logarithm three hundred and eighty-
one degrees........................2.580925
―――――――
4.659691 sine of thirty-nine degrees or 119.88 plus one-fourth length or 95.25 equals 215.13. The logarithm of 215.13 is 2.332701.

Subtract the last logarithm from the first, as stated in the rule:

4.659691
2.332701 remainder 2.326990, which is the logarithm of 212.32.

Thus the pivot B must be located 212.32 millimeters from the points E or from any one of said points, in case of an angle of thirty-nine degrees.

If the calculation is to be carried out with inches, instead of millimeters, then proceed as follows: E F or length of instrument equals fifteen inches, one-half E F or the radius equals 7.5 inches, one-fourth E F equals 3.75 inches. The sine of thirty-nine degrees equals 4.7199 inches if the radius equals 7.5 inches.

Then by logarithms—
Logarithm sine thirty-nine degrees, 0.673932
Logarithm fifteen degrees.........1.176091

1,850023 sine of thirty-nine degrees or 4.7199 plus one-fourth length or 3.75 equals 8.4699. The logarithm of 8.4699 is 0.927878, which, subtracted from 1.850023, leaves the remainder 0.922145, which is the logarithm of 8.53588. Thus the pivot B must be 8.53588 inches from point E in the case of the angle thirty-nine degrees.

With the angle equal to seven degrees, and calculating by millimeters, the calculation is as follows:

The radius being 190.5 millimeters, as before, the sine of seven degrees is 23.217 millimeters. The logarithm of 23.217 is 1.3657918.

1.3657918
log. 381  2.580925

3.9467168 sine of thirty-nine degrees or 23.217 plus 95.25 or one-fourth length equals 118.467, the logarithm of which is 2.0736084, which, subtracted from 3.9467168, leaves 1.8731084 or the logarithm of 74.663. Thus the distance from E to B must be 74.663 millimeters in case of an angle of seven degrees. Of course it is obvious that in the case of the instrument in the drawings the distance from the pivot to the indicator must be added to the above results in order to locate the scale-marks. Thus the distance from point E to pivot B in the case of an angle of thirty-nine degrees equals 8.53588 inches. To this result add the distance from pivot to indicator, or, say, 0.6 of an inch. The sum gives the location of the scale-mark 39. If the pivot and indicator coincides, the scale-mark 39 would be of course opposite the pivot.

What I claim as new, and desire to secure by Letters Patent, is—

A measuring-instrument consisting of proportional dividers having the scale so graduated that when the pivot or indicator is set to a number indicating the degrees or dimensions of an angle and one set of divider ends is placed over the points indicating the mouth of the angle the other set of divider ends will measure the radius of a circle, the circumference of which passes through said points and the apex of the angle, substantially as described.

In testimony whereof I have hereunto set my hand in the presence of two witnesses.

JOHN F. SCHELLER.

Witnesses:
WM. C. HAUFF,
E. F. KASTENHUBER.